(12) United States Patent
Reeh et al.

(10) Patent No.: US 11,954,248 B1
(45) Date of Patent: Apr. 9, 2024

(54) POSE PREDICTION FOR REMOTE RENDERING

(71) Applicant: Microsoft Technology Licensing, LLC, Redmond, WA (US)

(72) Inventors: Matthias Felix Reeh, Ostfildern (DE); Christian Voss-Wolff, Herzberg am Harz (DE); Alex Christopher Turner, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/185,432

(22) Filed: Mar. 17, 2023

(51) Int. Cl.
  *G06F 3/01* (2006.01)
(52) U.S. Cl.
  CPC .................................. *G06F 3/012* (2013.01)
(58) Field of Classification Search
  CPC ...................................................... G06F 3/012
  See application file for complete search history.

(56) References Cited

U.S. PATENT DOCUMENTS

| | | | |
|---|---|---|---|
| 7,274,810 B2 | 9/2007 | Reeves et al. | |
| 9,928,655 B1* | 3/2018 | Alston | G06F 3/04815 |
| 10,403,032 B2 | 9/2019 | Schmalstieg et al. | |
| 10,445,922 B2 | 10/2019 | Anderson et al. | |
| 11,032,534 B1 | 6/2021 | Voss-Wolff et al. | |
| 2003/0011595 A1 | 1/2003 | Goel et al. | |
| 2015/0029218 A1* | 1/2015 | Williams | G02B 27/0172 |
| | | | 345/633 |
| 2017/0115488 A1* | 4/2017 | Ambrus | G02B 27/0172 |
| 2017/0285736 A1* | 10/2017 | Young | G06F 3/013 |
| 2017/0302918 A1* | 10/2017 | Mammou | H04N 19/103 |
| 2017/0302972 A1* | 10/2017 | Zhang | H04N 21/2343 |
| 2017/0374343 A1 | 12/2017 | Boulton et al. | |
| 2018/0270531 A1* | 9/2018 | Ye | H04L 43/16 |
| 2018/0286112 A1 | 10/2018 | Lauritzen et al. | |
| 2018/0336008 A1* | 11/2018 | Nakagawa | G06V 40/28 |
| 2019/0052838 A1* | 2/2019 | Ashkenazi | G06T 7/70 |
| 2019/0340812 A1 | 11/2019 | Fuetterling et al. | |
| 2020/0202481 A1 | 6/2020 | Brigg et al. | |
| 2020/0348515 A1* | 11/2020 | Peuhkurinen | G02B 27/0172 |
| 2021/0133850 A1* | 5/2021 | Ayush | G06V 10/945 |
| 2021/0358219 A1* | 11/2021 | Melkote Krishnaprasad | |
| | | | G06T 19/006 |
| 2021/0373678 A1* | 12/2021 | Chauvin | G06F 3/0383 |
| 2021/0409235 A1* | 12/2021 | Cui | H04L 12/189 |

(Continued)

OTHER PUBLICATIONS

"Tutorial 9 : VBO Indexing", Retrieved From: http://www.opengl-tutorial.org/intermediate-tutorials/tutorial-9-vbo-indexing/, Retrieved On: May 16, 2022, 4 Pages.

(Continued)

*Primary Examiner* — Ryan A Lubit
(74) *Attorney, Agent, or Firm* — Barta Jones, PLLC

(57) ABSTRACT

A display pose of a client computing device is computed in a hybrid manner using both the client computing device and a server. Using the client computing device, an initial pose of the client computing device at an initial time is computed. A prospective pose at a target time is predicted using the client computing device. The prospective pose is sent along with auxiliary data from the client computing device to the server and a display pose of the client computing device at a display time is computed. The display pose is computed using the prospective pose and the auxiliary data.

20 Claims, 8 Drawing Sheets

(56) References Cited

U.S. PATENT DOCUMENTS

2022/0066543 A1* 3/2022 Rhyu ..................... H04W 4/30
2022/0253966 A1* 8/2022 Croxford ................. G06T 1/20
2022/0301262 A1* 9/2022 Aksit ....................... G06T 7/20
2022/0394225 A1* 12/2022 Champion ......... G02B 27/0093

OTHER PUBLICATIONS

"Notice of Allowance Issued in U.S. Appl. No. 16/796,640", dated Feb. 9, 2021, 9 Pages.

Gao, et al., "Mesh Simplification with Average Planes for 3-D Image", In Proceedings of International Conference on Systems, Man & Cybernetics: "Cybernetics Evolving to Systems, Humans, Organizations, and their Complex Interactions", Oct. 8, 2000, pp. 1412-1417.

Khoury, et al., "Adaptive GPU Tessellation with Compute Shaders", Retrieved from: https://onrendering.com/data/papers/isubd/isubd.pdf, Oct. 1, 2018, 14 Pages.

Niessner, et al., "Real-Time Rendering Techniques with Hardware Tessellation", In Journal of Computer Graphics Forum, vol. 35, Issue 1, Feb. 2016, pp. 113-137.

Pajak, et al., "Scalable Remote Rendering with Depth and Motion-flow Augmented Streaming", In Journal of Computer Graphics Forum, vol. 30, Issue 2, Apr. 28, 2011, 10 Pages.

"International Search Report and the Written Opinion Issued in PCT Application No. PCT/US21/012024", dated Apr. 23, 2021, 15 Pages.

\* cited by examiner

POSE PREDICTION FOR REMOTE RENDERING

BACKGROUND

In remote rendering scenarios, a server renders graphics and sends the resulting images over a network to a client computing device, such as a virtual or augmented reality headset, for display. The server uses information about the client computing device's pose (3D position and orientation) when rendering an image so that the display is appropriate for the 3D position and orientation of the client device in an environment.

The embodiments described below are not limited to implementations which solve any or all of the disadvantages of known methods for remote rendering.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A display pose of a client computing device is computed in a hybrid manner using both the client computing device and a server. Using the client computing device, an initial pose of the client computing device at an initial time is computed. A prospective pose at a target time is predicted using the client computing device. The prospective pose is sent along with auxiliary data from the client computing device to the server and a display pose of the client computing device at a display time is computed. The display pose is computed using the prospective pose and the auxiliary data.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
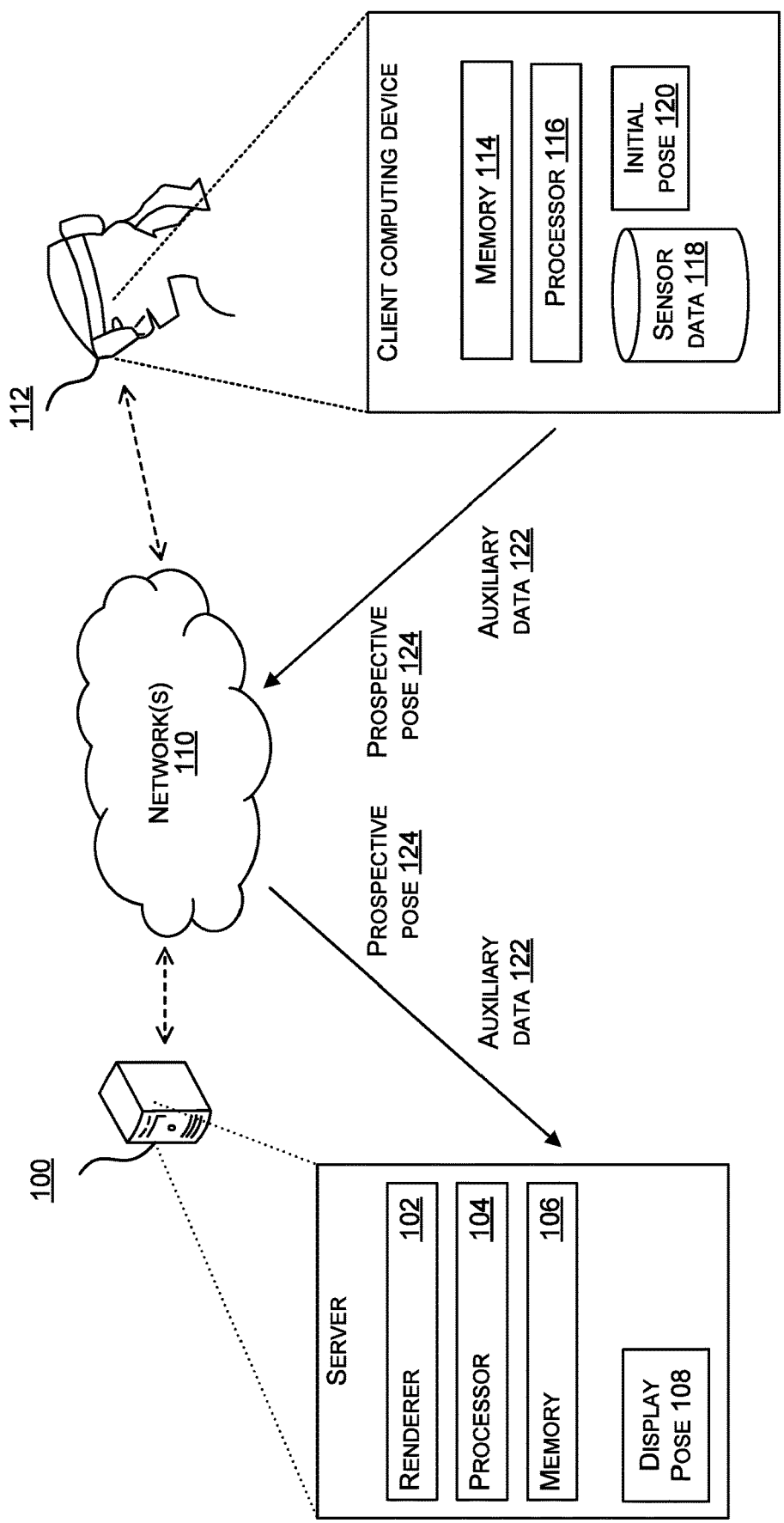
FIG. 1 is a schematic diagram showing computation of a display pose of a client computing device in a hybrid manner.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

In remote rendering scenarios, a server renders an image and sends the rendered image via a network to a client computing device such as a virtual or augmented reality headset. In various examples, remote rendering is employed by virtual or augmented reality computing systems where the client computing device is limited in power and computer processing capabilities. The server compensates for lack of resources on the client computing device by rendering an image remotely and sending the rendered image to the client computing device via a network. In various examples, the server renders and sends via the network many image frames in succession in order to generate a smooth video stream for display at the client computing device.

Information regarding the pose of the client computing device is used by the server to render imagery. A pose is an orientation and 3D position in a coordinate frame. Because of inherent latency in a remote rendering system, the server relies on a prediction of the client pose at time of display when rendering imagery. Accurate pose prediction is desired because misalignment of the displayed image relative to the actual display pose causes user discomfort. The present disclosure is concerned with how to accurately compute the display pose of the client device in an efficient manner.

In remote rendering scenarios, the client computing device collects sensor data including linear and rotational velocity and acceleration. The full sensor data is available to the client device itself. The client computing device furthermore exposes either the full sensor data, or a limited amount of the sensor data to the server. The amount of data exposed depends on the application programming interface (API) of the client computing device. The sensor data is used to track the pose of the client computing device. The sensor data is also used to predict the client's pose at the time the rendered image will be displayed to the user. The pose is predicted based on a predicted display time and the sensor data.

One approach to remote rendering technology involves predicting the pose at display time at the client computing device. Another approach involves predicting the pose at display time at the server. Each of these approaches poses difficulties which affect the performance of a remote rendering system.

When the pose is predicted at the client and sent to the server via the network, predictions may not reach the server in time for the next image to be rendered. Furthermore, the client is not able to adjust its predictions to compensate for sudden systematic changes in processing or network latency which require the predicted display pose to be updated. These difficulties negatively affect the performance of client-side pose prediction.

When pose is predicted at the server, sensor data is sent to the server via the network to facilitate the prediction. In some examples, where the API exposes the full sensor data, the server predicts the pose based on linear and rotational velocity and acceleration data. However in other examples, where the API exposes only limited sensor data, the server predicts the prospective pose based only on linear and rotational velocity data. When server access to sensor data is limited, server-side pose prediction is less accurate and of a lower quality.

The technology described herein involves computing the display pose of a client device in a way that improves performance and accuracy of pose prediction. In turn the accuracy of rendered images is improved; that is rendered images depict holograms or other 3D display content in a manner that accurately fits 3D position and orientation of a client device. The technology may be used in an iterative manner so that where a client device is moving in an environment images are rendered in real time for display by the client device so as to agree with current pose of the client device in the environment. In various examples, display pose is predicted in a hybrid manner using both the server and the client computing device. Since computing resources at the server are greater than at the client it is possible to compute high quality pose and/or high quality images by making as much use of the server as possible.

In various examples, the client computing device is used to compute an initial pose of the client computing device at an initial time. The client computing device is also used to predict a prospective pose at a target time using the initial pose and sensor data. The prospective pose is sent along with auxiliary data from the client computing device to the server. At the server, a display pose of the client computing device at a display time is computed using the prospective pose and auxiliary data. Auxiliary data is any sensor data measurements, information derived from sensor data measurements, or any other data about 3D position or orientation of the client computing device such as information about a route the client computing device is travelling on.

The target time mentioned above is a predicted display time for a rendered image. For example, the target time in some examples is the time of a frame N. The prospective pose mentioned above is a primary prediction of the client's pose at the target time. In various examples, the client computing device uses the target time as well as initial pose and sensor data available to the client computing device in order to predict the prospective pose. Typically, full sensor data including both linear and rotational velocity and acceleration data are available to the client computing device when predicting the prospective pose. The client sends the prospective pose, along with auxiliary data to the server.

In some cases, the auxiliary data comprises sensor data which is sometimes limited to velocity data. In some other examples, auxiliary data comprises a preliminary prediction of the client's pose at a subsequent time to the target time. Examples of auxiliary data are explained in more detail below. At the server, auxiliary data is used along with the prospective pose to compute a display pose at a display time. The display time is an updated version of the target time which was used to compute the prospective pose. The target time becomes outdated in example remote rendering scenarios where there are sudden systematic changes in processing or network latency.

In other scenarios, the target time becomes outdated in scenarios where packet loss and packet delays mean that the prospective pose does not arrive on time for rendering of the image for display at the target time. The aforementioned display pose is a server side prediction of the client's pose at the display time. The display pose is an updated version of the prospective pose. Computing display pose at the server using the prospective pose and the auxiliary data means that packet losses and delays in the network, as well as systematic changes in processing or network latency, can be compensated for at the server immediately prior to rendering resulting in more accurate pose prediction and therefore a more comfortable user viewing experience. Computing the prospective pose at the client device with access to full sensor data means that the prospective pose is an accurate prediction of the pose at target time. Therefore even if limited sensor data is sent to the server as auxiliary data, the correction applied to the prospective pose by the server using the auxiliary data is still of a high quality relative to existing technology where server side pose prediction uses only limited sensor data, without leveraging the higher accuracy of client side prediction using the full data.

The degree of the hybrid manner in some cases is controlled according to similarity between the target time and the display time. The control is achieved by using rules, thresholds or criteria at one or both of the client computing device and the server. The degree of the hybrid manner means the degree of pose prediction that takes place on the client and server. In an example, functionality at the server computes a similarity between the target time and the display time by computing a difference between the target time and the display time and checking if the difference is below a threshold. The functionality at the server uses rules to check if the difference is below a threshold. If so, the server contributes less to the pose prediction.

In an example scenario, the target and the display time are the same because the prospective pose is sent in a timely manner across the network, there are no changes in the systematic latency, and the prospective pose arrives at the server in time for rendering of an image to be displayed at the target time. No compensation or correction is required at the server and therefore the pose prediction takes place almost entirely on the client computing device. In other examples, the target time and the display time differ more significantly. For example if an entire data packet is lost in the network, a more significant correction is required on the server side before rendering. Typically, the more similar the target time and the display time, the less the server contributes to pose prediction.

The degree of the hybrid manner in some cases is controlled according to information available from the client computing device. When the API of the client device exposes the full sensor data to be sent to the server, the server computes the display pose to a higher accuracy. The degree of the hybrid manner can therefore shift towards the server, for example. In other scenarios, only limited sensor data is exposed by the client's API and in some examples this means that the degree of the hybrid manner shifts towards the client which does have access to the full sensor data.

In some cases the client's API only exposes limited sensor data but because the difference between the target time and display time is small the display pose is only slightly less accurate than if it had been computed using the full sensor data.

The degree of the hybrid manner may vary dynamically from frame to frame across a video stream. In some examples, the degree of the hybrid manner changes as the aforementioned method is repeated during motion of the client computing device. The method is therefore dynamic and able to adjust to for example different network conditions during motion of the client computing device.

The degree of change of the hybrid manner is in some cases controlled according to factors in the following non-exhaustive list: round trip time of a communications link between the client and the server, packet loss on the communications, local processing time on the client, local processing and rendering time on the server and frequency of image display on the client.

In an example of the present technology, the auxiliary data comprises velocity data of the client computing device and the server uses the velocity data and the prospective pose to compute display pose.

In another example, the auxiliary data comprises acceleration and velocity data of the client computing device. The prospective pose is the initial pose of the client. The server uses acceleration and velocity data as well as the initial pose to compute the display pose. In that scenario, the client computing device is not making a pose prediction which saves computational resources at the client device.

In another example, the auxiliary data comprises a subsequent pose prediction of the client computing device at a time which is later than the target time. For example, the subsequent pose prediction is a preliminary prediction of pose for a future step. The subsequent pose prediction is used by the server to compute the display pose. For example, the server can apply a correction to the prospective pose which is based on the subsequent pose prediction.

Further the auxiliary data in some examples comprises multiple subsequent pose predictions at multiples times after the target time.

The auxiliary data in other examples comprises a subsequent pose prediction of the client computing device at a time which is later than the target time, as well as velocity and acceleration data. The subsequent pose prediction, velocity and acceleration are used by the server to compute the display pose.

The auxiliary data may also comprise any or all of the raw sensor data collected by the client computing device. Additionally or alternatively the auxiliary data comprises any derivative of the raw sensor data.

FIG. 1 is a schematic diagram showing computation of a display pose of a client computing device in a hybrid manner. Client computing device 112 is connected to a remote server 100 via a network 110. In various examples, client computing device 112 is a head-mounted display HMD such as a virtual or augmented reality headset. Client computing device 112 includes at least a memory 114 and processor 116. Client computing device 112 collects sensor data 118 for example linear and rotational acceleration and velocity data. The sensor data 118 may be collected from sensors embedded in the client computing device or a companion device. In an example the sensors are one or more of: an accelerometer, a gyroscope, a global positioning system, an optical sensor, an inertial sensor.

Client computing device 112 computes an initial pose 120 of the client computing device 112 at an initial time, based on the sensor data. In various example methods for computing a display pose of client computing device 112 in a hybrid manner, client computing device 112 sends via the network a prospective pose 124, which is a predicted pose of the client computing device at a target time. Client computing device 112 also sends auxiliary data 122 via the network to server 100. Server 100 includes at least a processor 104 and a memory 106. In remote rendering scenarios, renderer 102 at the server 100 renders imagery for display at the client computing device. Server 100 computes display pose 108 which is the pose of client computing device 112 at a display time using auxiliary data 122 and prospective pose 124. The computed display pose is suitable for use in rendering imagery at the server. The renderer 102 is any commercially available functionality for rendering images from a 3D model such as Unity (trade mark), Unreal (trade mark), or Azure Remote Rendering (trade mark) which use techniques such as ray tracing, variants of ray tracing such a path tracing, triangle-based rasterization, or hybrid combinations of any of the aforementioned techniques. The renderer 102 renders an image from a 3D model stored in memory 106 or elsewhere accessible via network 110. The image is rendered according to the computed display pose and is sent from the server to the client computing device 112 for display. In situations where the client computing device 112 is an HMD the rendered image is displayed at the HMD.

Figure 2:
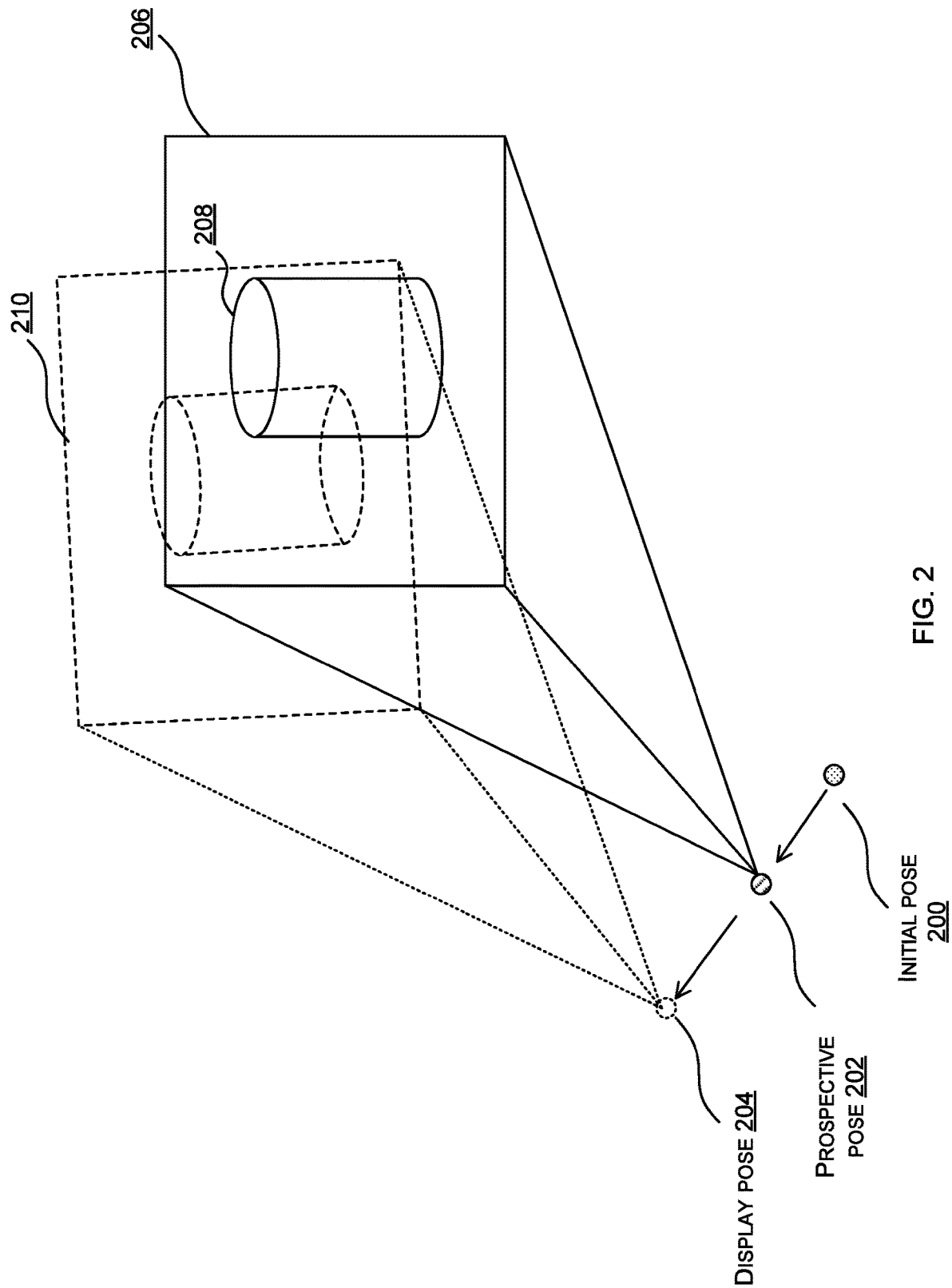
FIG. 2 is a schematic diagram showing an initial pose, a prospective pose and a display pose of a client computing device.

FIG. 2 is a schematic diagram showing an initial pose 200, a prospective pose 202 and a display pose 204 of a client computing device such as client computing device 112 of FIG. 2. Initial pose 200 is a pose computed by the client computing device 112 at an initial time using sensor data collected by the client computing device. The sensor data collected by the client computing device comprises any one or more of: images depicting an environment of the client computing device, velocity of the client computing device, acceleration of the client computing device, or other sensor data. Prospective pose 202 is the predicted pose of the client computing device at a target time. The target time is a predicted display time. Based on initial pose 200 and sensor data collected by the client computing device, the client predicts the prospective pose and sends it to the server, where imagery is rendered. Image 206 depicts an image including virtual object 208 (e.g., a cylinder) which may be rendered based on the prospective pose 202. In various examples, the target time is different from the actual display time of the rendered image. In such scenarios, the prospective pose 202 is corrected to display pose 204 before rendering to avoid user discomfort. Display pose 204 is the computed pose of the client device at the display time. The display pose 204 is predicted since because of the time taken to render an image it cannot be observed at the actual display time. Display pose 204 is used by the server to render image 210 for display.

Figure 3:
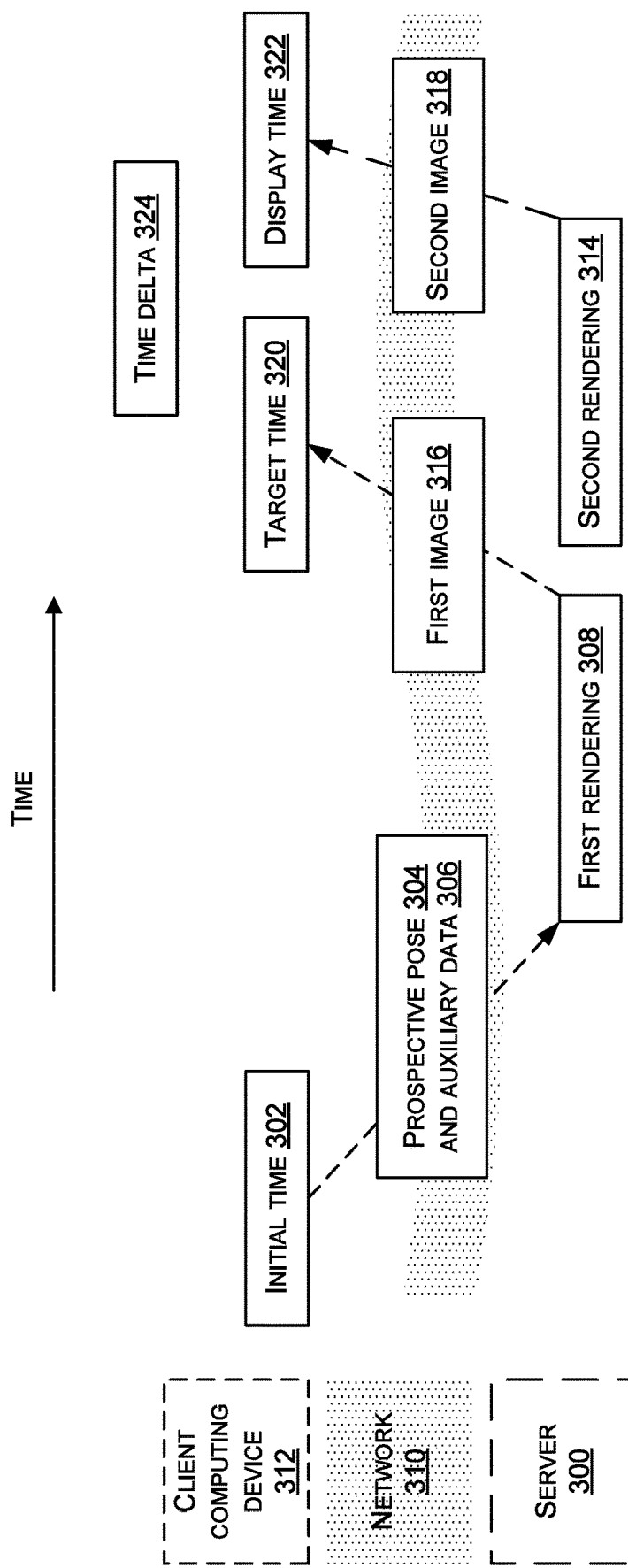
FIG. 3 is a schematic diagram of rendering an image for display at a display time at a client device.

FIG. 3 is a schematic diagram of rendering an image for display at a display time at a client device such as client device 112 of FIG. 1. Client computing device 312 (which may be client device 112 of FIG. 1 or another client device) and server 300 are connected via network 310. Network 310 is any communications network such as the internet, an intranet, a wireless communications network. In FIG. 3 time is represented as indicated by an arrow so that the relative position of boxes indicates a chronological order.

At initial time 302 client computing device 312 computes an initial pose. The client computing device computes a prospective pose 304 which is a predicted pose of the client computing device 312 at a target time. Client computing device sends via the network the prospective pose 304 along with auxiliary data 306 to server 300. At a first rendering 308, server 300 uses prospective pose 304 in order to render a first image 316 for display at the target time 320 which was used to compute the prospective pose. There is no difference between the actual display time and the target time. However, at second rendering 314 the server renders a second image 318 for display at display time 322 which is different from target time 320. In some examples, this scenario arises when a data packet is lost in network 310. When there is a difference between the target time 320 and display time 322, in other words there is a time delta 324, server 300 uses auxiliary data 306 to correct the prospective pose 304 and compute a display pose. The display pose is the pose of client computing device 312 at display time 322, and it is used to render second image 318 for display at the client device.

Figure 4:
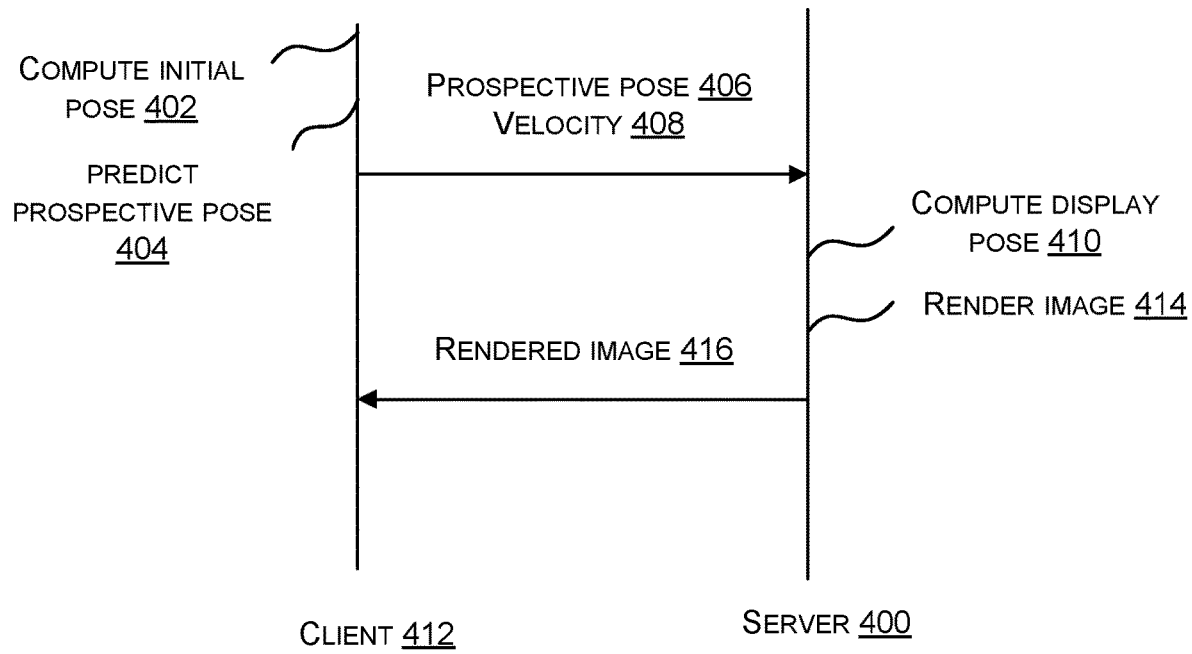
FIG. 4 is a schematic diagram showing an example method for computing a display pose in a hybrid manner and rendering an image for display at a client device.

FIG. 4 is a schematic diagram showing an example method for computing a display pose in a hybrid manner and rendering an image for display at a client device. Client 412 computes an initial pose 402 and at 404 predicts a prospective pose. The client sends prospective pose 406 as well as velocity data 408 to server 400. Server 400 computes a display pose using the prospective pose 406 and velocity data 408 and at 414 renders an image based on the display pose. The rendered image 416 is sent across a network to client 412 for display at display time.

Figure 5:
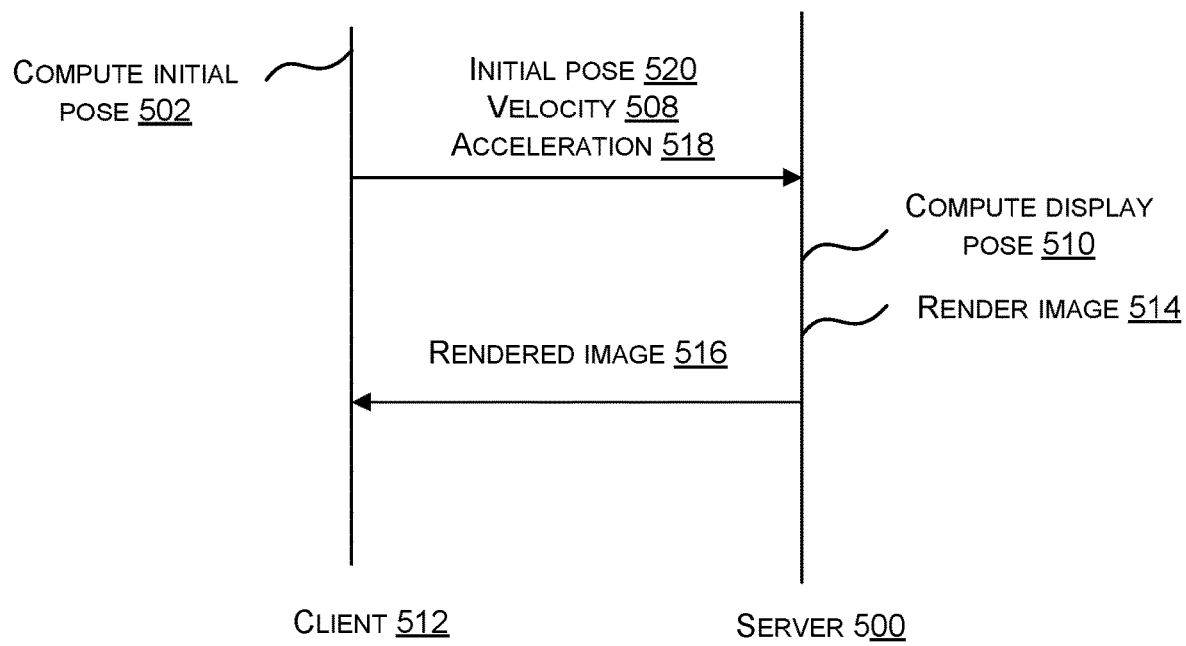
FIG. 5 is a schematic diagram showing another example method for computing a display pose in a hybrid manner and rendering an image for display at a client device.

FIG. 5 is a schematic diagram showing another example method for computing a display pose in a hybrid manner and rendering an image for display at a client device. Client 512 computes an initial pose 502. The client sends initial pose 520 as well as velocity data 508 and acceleration data 518 to server 500. Server 500 computes a display pose using initial pose 520, velocity data 508 and acceleration data 518 and at 514 renders an image based on the display pose. The rendered image 516 is sent across a network to client 512 for display at display time.

Figure 6:
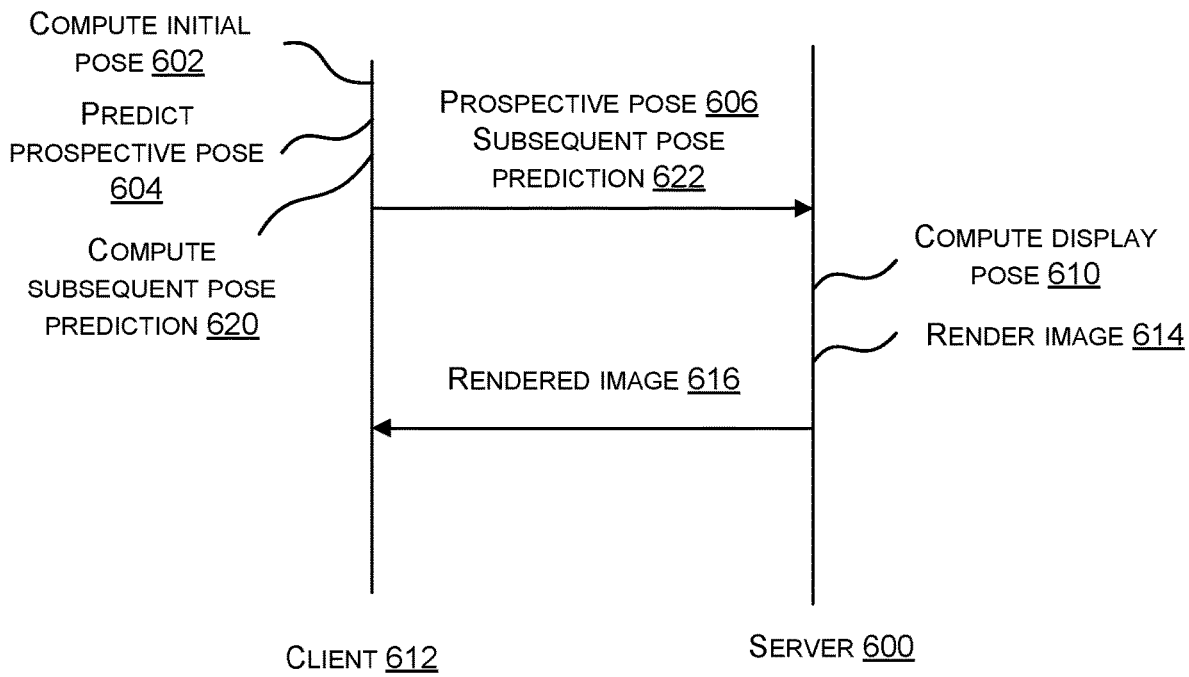
FIG. 6 is a schematic diagram showing another example method for computing a display pose in a hybrid manner and rendering an image for display at a client device.

FIG. 6 is a schematic diagram showing another example method for computing a display pose in a hybrid manner and rendering an image for display at a client device. Client 612 computes an initial pose at 602, a prospective pose at 604 and a subsequent pose prediction at 620. The client sends prospective pose 606 as well as to subsequent pose prediction 622 to server 600. Server 600 computes a display pose 610 using the prospective pose and the subsequent pose prediction and at 614 renders an image based on the display pose. The rendered image 616 is sent across a network to client 612 for display at display time.

Figure 7:
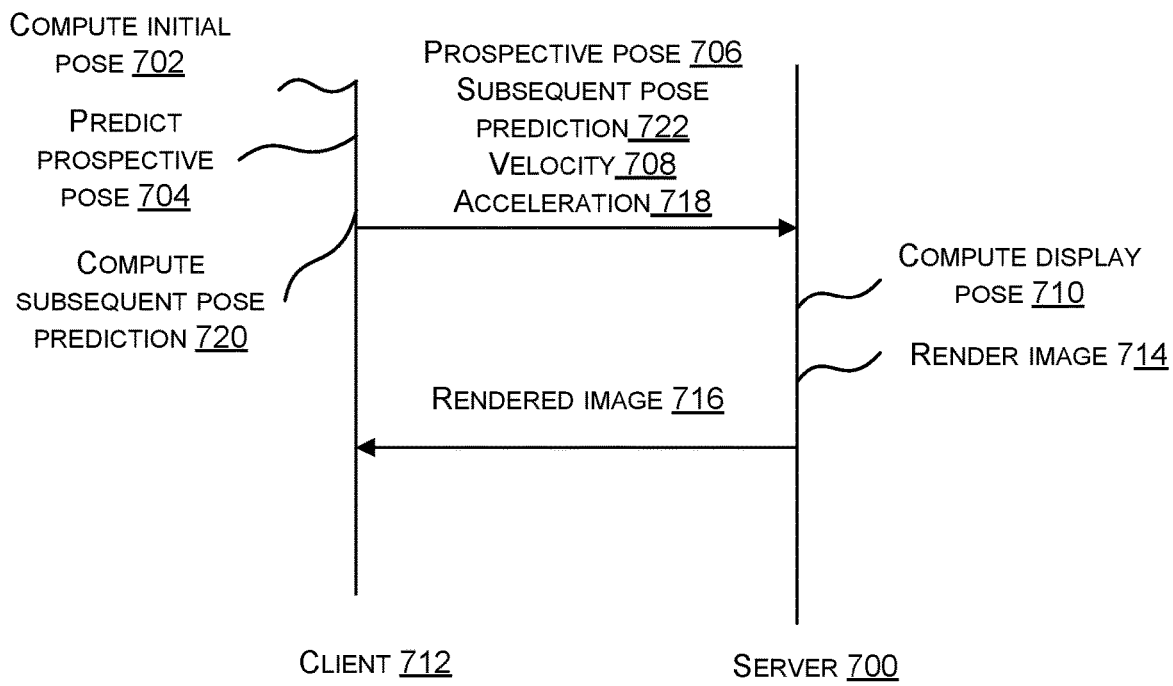
FIG. 7 is a schematic diagram showing another example method for computing a display pose in a hybrid manner and rendering an image for display at a client device.

FIG. 7 is a schematic diagram showing another example method for computing a display pose in a hybrid manner and rendering an image for display at a client device. Client 712 computes an initial pose at 702, a prospective pose at 704 and a subsequent pose prediction at 720. The client sends prospective pose 706 as well as to subsequent pose prediction 722, velocity data 708 and acceleration data 718 to server 700. Server 700 computes a display pose 710 using the prospective pose, the subsequent pose prediction and the velocity and acceleration data and at 714 renders an image based on the display pose. The rendered image 716 is sent across a network to client 712 for display at display time.

Figure 8:
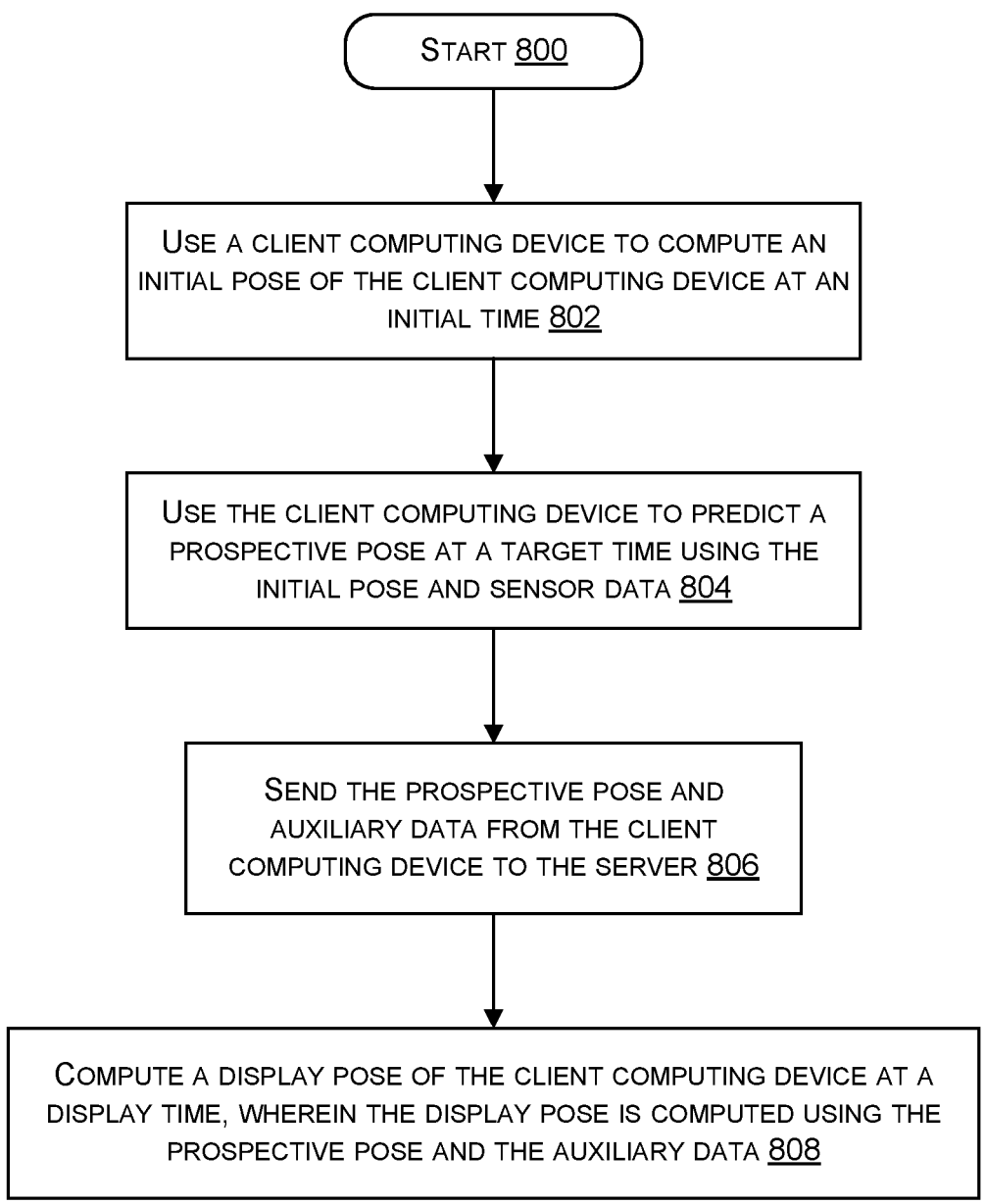
FIG. 8 is a flow diagram of a method for computing a display pose of a client device in a hybrid manner.

FIG. 8 is a flow diagram of a method for computing a display pose of a client device in a hybrid manner. In an example the client device is client device 112 of FIG. 1. The method starts at block 800 and at block 802, a client computing device is used to compute an initial pose of the client computing device at an initial time. The client computing device computes its initial pose using captured sensor data such as from any one or more of: a global positioning system, an accelerometer, a gyroscope, a depth camera, a video camera, a color camera. In some cases the client device comprises a pose tracker which is functionality to compute a pose of the client device by fitting captured sensor data to a 3D model of an environment of the client device. Pose tracker technology is well known and a summary of an example of pose tracker technology is now given. In an example the pose tracker comprises a trained machine learning model trained to predict a plurality of correspondences between 2D image points and 3D positions in a 3D model or map of the environment. The correspondences are used by a perspective n point (PnP) solver to compute a pose of the client computing device. Any well-known PnP solver may be used. The trained machine learning model is a neural network or a random decision forest or any other trained machine learning model. The trained machine learning model has been trained in advance for the particular environment of the client computing device, such as a particular room or a particular garden or other environment. The trained machine learning model is trained using supervised learning such as any well-known backpropagation process. The training data comprises images depicting the environment and where 2D locations in the images are known to depict known 3D positions in the environment. The training data may be obtained by manually annotating the images or by using a camera rig comprising multiple fixed cameras with known 3D position and orientation so that 2D locations in the images are known to depict known 3D positions in the environment.

At block 804, the client computing device is used to predict a prospective pose at a target time using the initial pose and sensor data. In an example, the prospective pose is predicted from the initial pose using one or more of: information about motion of the client computing device, rules, historical pose data of the client device, extrapolation, a trained machine learning model, information about an activity a user of the client computing device is doing. The prospective pose is predicted from the initial pose and sensor data, such as any sensor data available to the client which is unavailable to the server at the time. The sensor data used by the client computing device to predict the prospective pose may be from sensors in the client computing device and/or from sensors at other locations. At block 806, the prospective pose and auxiliary data is sent from the client computing device to the server. The prospective pose and auxiliary data may be sent using any suitable communications protocol and communications link between the client computing device and the server. At block 808 a display pose of the client computing device at a display time is computed, wherein the display pose is computed using the prospective pose and the auxiliary data. In an example, the display pose is computed by updating the prospective pose in the light of the auxiliary data. In an example where the auxiliary data comprises a velocity of the client computing device, the velocity comprises a direction and a speed. Therefore the prospective pose (3D position and orientation) is updated by translating the 3D position of the prospective pose by an amount and in a direction according to the velocity and a time differential of the display time and the target time. In an example where the auxiliary data comprises an acceleration and a velocity of the client computing device, the 3D position component of the prospective pose is translated by an amount according to the acceleration, the velocity and a time differential of the display time and the target time.

Figure 9:
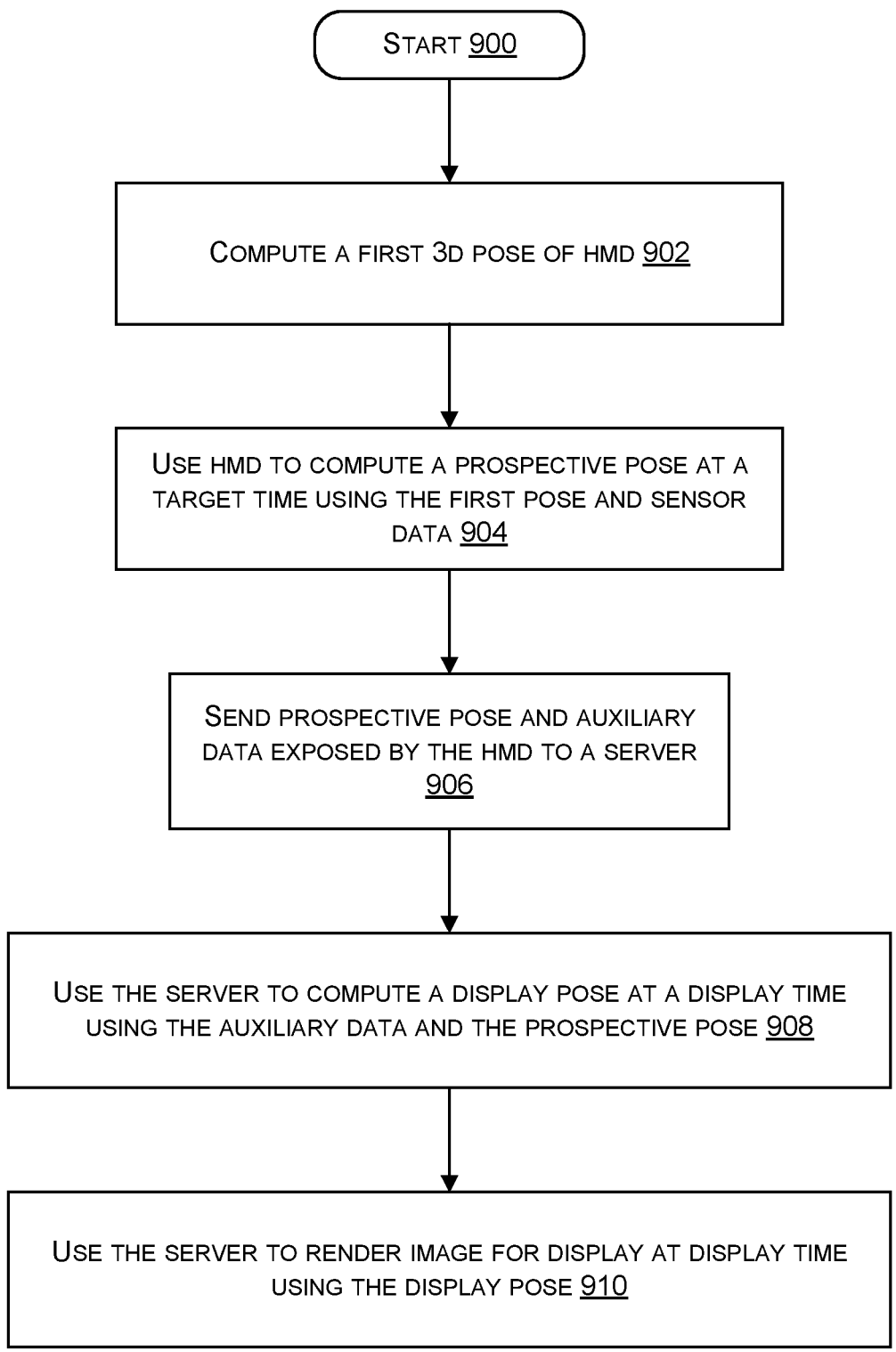
FIG. 9 is a flow diagram of a method for computing a display pose of a client device in a hybrid manner.

FIG. 9 is a flow diagram of a method for rendering an image for display at a head mounted device (HMD). The method starts at block 900 and at block 902, a first 3D pose of the HMD is computed. At block 904 the HMD is used to compute a prospective pose at a target time using the first pose and sensor data. At block 906 the HMD sends the prospective pose and auxiliary data exposed by the HMD to a server. The server is used at block 908 to compute a display pose at a display time using the auxiliary data and the prospective pose. At block 910, the server is used to render an image for display at display time using the display pose.

Figure 10:
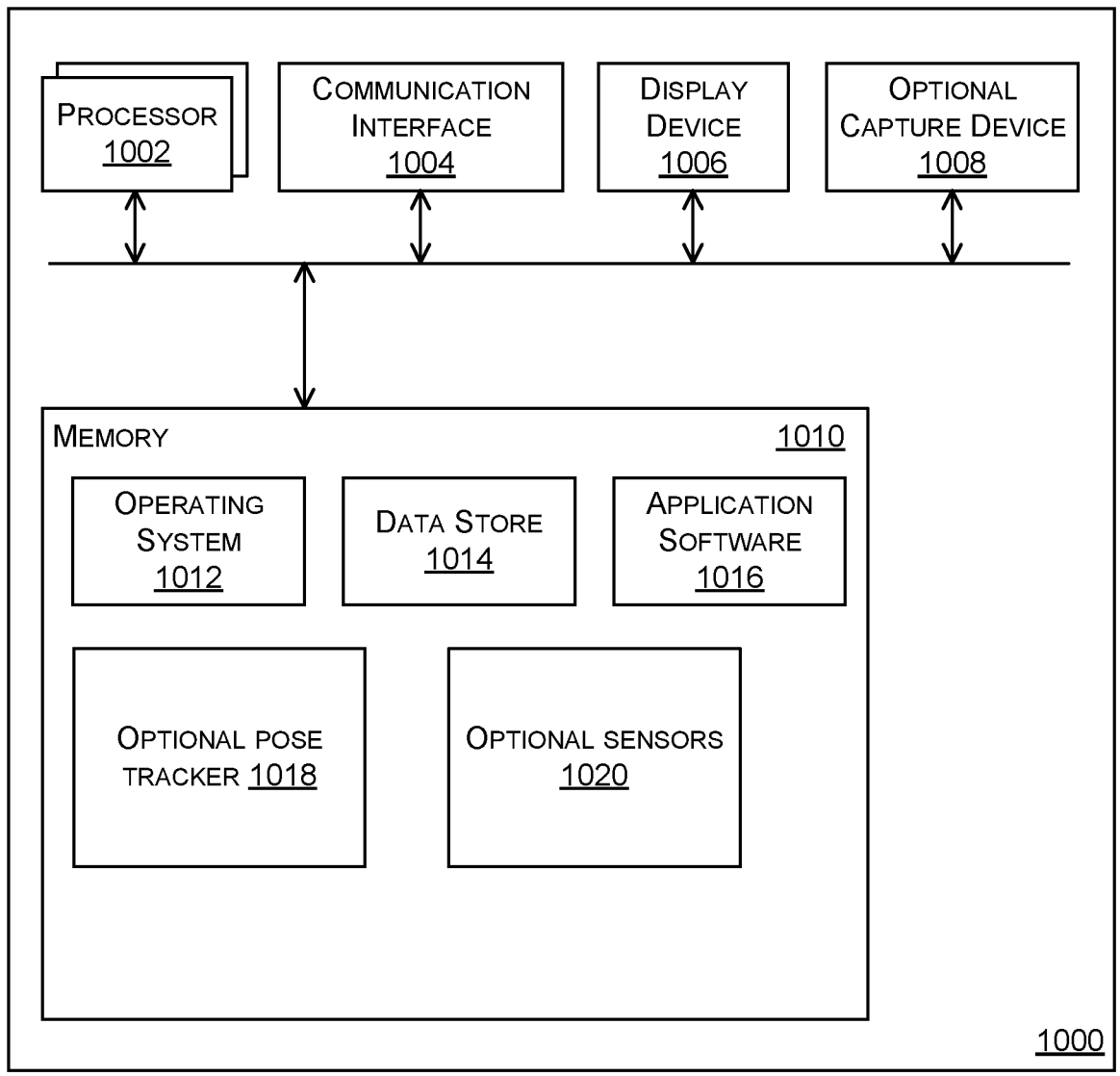
FIG. 10 illustrates an exemplary computing-based device in which examples of computing a display pose are implemented.

FIG. 10 illustrates an exemplary computing-based device in which examples of computing a display pose are implemented. Computing-based device 1000 comprises one or more processors 1002 which are microprocessors, controllers, or any other suitable type of processors for processing computer executable instructions to control the operation of the device in order to compute pose predictions of display pose of a client computing device. In some examples, for example where a system on a chip architecture is used, the processors 1002 include one or more fixed function blocks (also referred to as accelerators) which implement a part of the method of any of FIGS. 1 to 9 in hardware (rather than software or firmware). Platform software comprising an operating system 1012 or any other suitable platform software is provided at the computing-based device to enable application software 1016 to be executed on the device. A data store 1014 holds sensor data, pose predictions, time predictions and other data. An optional pose tracker 1018 is functionality deployed in a computing device for computing a position and orientation of the computing device over time. Optional sensors 1020 on the computing device collect sensor data such as velocity and acceleration data.

The computer executable instructions are provided using any computer-readable media that are accessible by computing based device 1000. Computer readable media include, for example, computer storage media such as memory 1010 and communications media. Computer storage media, such as memory 1010, include volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1010) is shown within the computing-based device 1000 it will be appreciated that the storage is, in some examples, distributed or located remotely and accessed via a network or other communication link (e.g., using communication interface 1004).

The computing-based device 1000 has an optional display device 1006 to display output images and/or values of parameters. The computing-based device 1000 also has an optional capture device 1008 such as a depth camera, color camera, video camera, web camera or other image capture device.

Alternatively or in addition to the other examples described herein, examples include any combination of the following clauses:

Clause A. A method for computing a display pose of a client computing device in a hybrid manner using both the client computing device and a server, the method comprising: using the client computing device to compute an initial pose of the client computing device at an initial time; using the client computing device to predict a prospective pose at a target time using the initial pose and sensor data; sending the prospective pose and auxiliary data from the client computing device to the server; and computing a display pose of the client computing device at a display time, wherein the display pose is computed using the prospective pose and the auxiliary data.

Clause B. The method of clause A comprising controlling a degree of the hybrid manner according to similarity between the target time and the display time.

Clause C. The method of clause A or clause B comprising controlling a degree of the hybrid manner according to information available from the client computing device.

Clause D. The method of clause A, B or C wherein the auxiliary data comprises velocity of the client computing device; and wherein the velocity and the prospective pose are used by the server to compute the display pose.

Clause E. The method of clause A, B or C wherein the auxiliary data comprises acceleration and velocity of the client computing device and the prospective pose is the initial pose; and wherein the server uses the acceleration, the velocity, and the initial pose to compute the display pose.

Clause F. The method of clause A, B or C wherein the auxiliary data comprises a subsequent pose prediction of the client computing device at a time which is later than the target time; and wherein the subsequent pose prediction is used by the server to compute the display pose.

Clause G. The method of clause A, B or C wherein the auxiliary data comprises a subsequent pose prediction of the client computing device at a time which is later than the target time, velocity and acceleration; and wherein the subsequent pose prediction, velocity and acceleration are used by the server to compute the display pose.

Clause H. The method of clause A, B or C wherein the auxiliary data comprises raw sensor data or a derivative of raw sensor data.

Clause I. The method of any preceding clause wherein a degree of the hybrid manner changes as the method is repeated during motion of the client computing device.

Clause J. The method of clause I wherein the degree of change of the hybrid manner is controlled according to factors comprising: round trip time of a communications link between the client computing device and the server, packet loss on the communications link, local processing time on the client, local processing and rendering time on the server, frequency of image display on the client device.

Clause K. A computing system comprising: a processor; a memory storing instructions that, when executed by the processor, perform a method for computing a display pose of a client computing device in a hybrid manner using both a client computing device and a server, the method comprising: using the client computing device to compute an initial pose of the client computing device at an initial time; using the client computing device to predict a prospective pose at a target time using the initial pose and sensor data; sending the prospective pose and auxiliary data from the client computing device to the server; and computing a display pose of the client computing device at a display time, wherein the display pose is computed using the prospective pose and the auxiliary data.

Clause L. The computing system of clause K, wherein the method further comprises controlling a degree of the hybrid manner according to similarity between the target time and the display time.

Clause M. The computing system of clause K or L, wherein the method further comprises controlling a degree of the hybrid manner according to information available from the client computing device.

Clause N. The computing system of clause K, L or M, wherein the auxiliary data comprises velocity of the client computing device; and wherein the velocity and the prospective pose are used by the server to compute the display pose.

Clause O. The computing system of clause K, L or M wherein the auxiliary data comprises acceleration and velocity of the client computing device and the prospective pose is the initial pose; and wherein the server uses the acceleration, the velocity, and the initial pose to compute the display pose.

Clause P. The computing system of clause K, L or M wherein the auxiliary data comprises a subsequent pose prediction of the client computing device at a time which is later than the target time; and wherein the subsequent pose prediction is used by the server to compute the display pose.

Clause Q. The computing system of clause K, L or M wherein the auxiliary data comprises a subsequent pose prediction of the client computing device at a time which is later than the target time, velocity and acceleration; and wherein the subsequent pose prediction, velocity and acceleration are used by the server to compute the display pose.

Clause R. The computing system of any preceding clause wherein a degree of the hybrid manner changes as the method is repeated during motion of the client computing device.

Clause S. The computing system of clause K wherein the degree of change of the hybrid manner is controlled according to factors comprising: round trip time of a communications link between the client computing device and the server, packet loss on the communications link, local processing time on the client, local processing and rendering time on the server, frequency of image display on the client.

Clause T. A method for rendering an image for display at a head mounted device HMD, the method comprising: computing a first 3D pose of the HMD; using the HMD to compute a prospective pose at a target time using the first pose and sensor data; sending the prospective pose and auxiliary data exposed by the HMD to a server; using the server to compute a display pose at a display time using the auxiliary data and the prospective pose; and using the server to render the image for display at the display time using the display pose.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method for computing a display pose of a client computing device in a hybrid manner using both the client computing device and a server, the method comprising:

using the client computing device to compute an initial pose of the client computing device at an initial time;
using the client computing device to predict a prospective pose at a target time using the initial pose and sensor data;
sending the prospective pose and auxiliary data from the client computing device to the server; and
computing the display pose of the client computing device at a display time,
wherein the display pose is computed using the prospective pose and the auxiliary data, wherein a degree of the hybrid manner changes based on a first parameter.

2. The method of claim 1 wherein the first parameter includes a similarity between the target time and the display time.

3. The method of claim 1 wherein the first parameter includes information available from the client computing device.

4. The method of claim 1 wherein the auxiliary data comprises velocity of the client computing device; and wherein the velocity and the prospective pose are used by the server to compute the display pose.

5. The method of claim 1 wherein the auxiliary data comprises acceleration and velocity of the client computing device and the prospective pose is the initial pose; and wherein the server uses the acceleration, the velocity, and the initial pose to compute the display pose.

6. The method of claim 1 wherein the auxiliary data comprises a subsequent pose prediction of the client computing device at a time which is later than the target time; and wherein the subsequent pose prediction is used by the server to compute the display pose.

7. The method of claim 1 wherein the auxiliary data comprises a subsequent pose prediction of the client computing device at a time which is later than the target time, velocity and acceleration; and wherein the subsequent pose prediction, velocity and acceleration are used by the server to compute the display pose.

8. The method of claim 1 wherein the auxiliary data comprises raw sensor data or a derivative of raw sensor data.

9. The method of claim 1 wherein the first parameter includes repeating the method during motion of the client computing device.

10. The method of claim 9 wherein the first parameter includes at least one of: round trip time of a communications link between the client computing device and the server, packet loss on the communications link, local processing time on the client, local processing and rendering time on the server, or frequency of image display on the client.

11. A computing system comprising:
a processor;
a memory storing instructions that, when executed by the processor, perform operations for computing a display pose of a client computing device in a hybrid manner using both the client computing device and a server, wherein the computing system is configured to:
use the client computing device to compute an initial pose of the client computing device at an initial time;
use the client computing device to predict a prospective pose at a target time using the initial pose and sensor data;
send the prospective pose and auxiliary data from the client computing device to the server; and
compute the display pose of the client computing device at a display time,
wherein the display pose is computed using the prospective pose and the auxiliary data, wherein a degree of the hybrid manner changes based on a first parameter.

12. The computing system of claim 11, wherein the first parameter includes a similarity between the target time and the display time.

13. The computing system of claim 11, wherein the first parameter includes information available from the client computing device.

14. The computing system of claim 11, wherein the auxiliary data comprises velocity of the client computing device; and wherein the velocity and the prospective pose are used by the server to compute the display pose.

15. The computing system of claim 11, wherein the auxiliary data comprises acceleration and velocity of the client computing device and the prospective pose is the initial pose; and wherein the server uses the acceleration, the velocity, and the initial pose to compute the display pose.

16. The computing system of claim 11, wherein the auxiliary data comprises a subsequent pose prediction of the client computing device at a time which is later than the target time; and wherein the subsequent pose prediction is used by the server to compute the display pose.

17. The computing system of claim 11, wherein the auxiliary data comprises a subsequent pose prediction of the client computing device at a time which is later than the target time, velocity and acceleration; and wherein the subsequent pose prediction, velocity and acceleration are used by the server to compute the display pose.

18. The computing system of claim 11 wherein the first parameter includes repeating the operations during motion of the client computing device.

19. The computing system of claim 18 wherein the first parameter includes at least one of: round trip time of a communications link between the client computing device and the server, packet loss on the communications link, local processing time on the client computing device, local processing and rendering time on the server, or frequency of image display on the client computing device.

20. A method for rendering an image for display at a head mounted device (HMD) in hybrid manner using the HMD and a server, the method comprising:
computing a first 3D pose of the HMD;
using the HMD to compute a prospective pose at a target time using the first pose and sensor data;
sending the prospective pose and auxiliary data exposed by the HMD to the server;
using the server to compute a display pose at a display time using the auxiliary data and the prospective pose, wherein a degree of the hybrid manner changes based on a first parameter; and
using the server to render the image for display at the display time using the display pose.

* * * * *